F. E. CASE.
SERIES PARALLEL SYSTEM OF CONTROL FOR TAPPED FIELD MOTORS.
APPLICATION FILED MAR. 24, 1915.
1,263,373.
Patented Apr. 23, 1918.
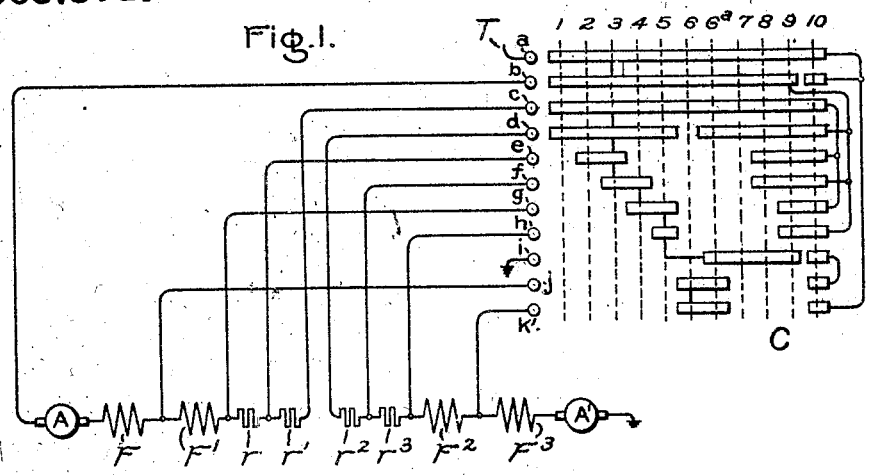
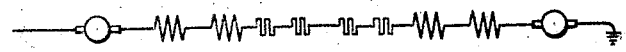
Fig. 2.
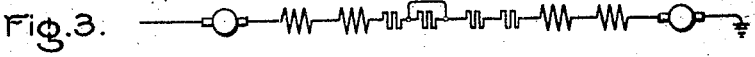
Fig. 3.
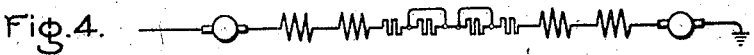
Fig. 4.
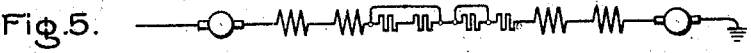
Fig. 5.
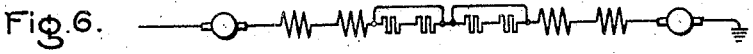
Fig. 6.
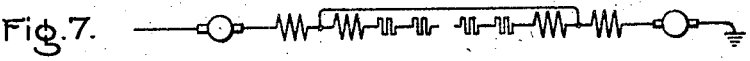
Fig. 7.
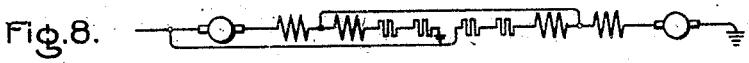
Fig. 8.
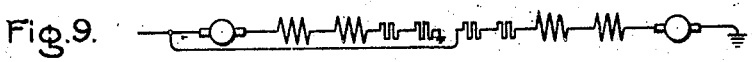
Fig. 9.
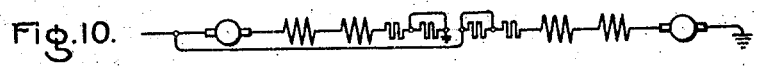
Fig. 10.
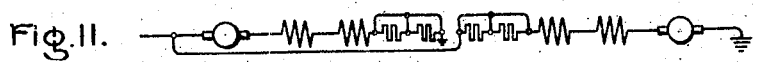
Fig. 11.
Fig. 12.
Witnesses:
Inventor:
Frank E. Case,
by
His Attorney

UNITED STATES PATENT OFFICE.

FRANK E. CASE, OF SCHENECTADY, NEW YORK, ASSIGNOR TO GENERAL ELECTRIC COMPANY, A CORPORATION OF NEW YORK.

SERIES-PARALLEL SYSTEM OF CONTROL FOR TAPPED-FIELD MOTORS.

1,263,373.  Specification of Letters Patent.  Patented Apr. 23, 1918.

Application filed March 24, 1915. Serial No. 16,746.

*To all whom it may concern:*

Be it known that I, FRANK E. CASE, a citizen of the United States, residing at Schenectady, county of Schenectady, State of New York, have invented certain new and useful Improvements in Series-Parallel Systems of Control for Tapped-Field Motors, of which the following is a specification.

My invention relates to the control of series wound electric motors and has for its object the provision of means whereby a plurality of such motors may be operated and controlled in an efficient manner.

My invention relates particularly to a series-parallel system of control for a plurality of series wound motors and provides a sequence of connections utilizing intermediate taps in the field windings for securing additional running connections and a greater range of speed control, by weakening the field strength of the various motors. More specifically my invention provides certain tapped field bridging or shunting connections whereby the transition from series to parallel relation is accomplished by means of a suitable controller without unbalancing the load on the motors and without opening the motor circuit.

Heretofore difficulty has been experienced in securing proper connections for tapped field motors during transition from series to parallel relation, as it is necessary to pass from the tapped field series arrangement to the first parallel arrangement with full field, and it is necessary during this transition, in order to eliminate the sag in torque, to avoid dropping back to the full field series position. My invention successfully overcomes this difficulty and by means of the connections which I provide, the torque on the various motors is maintained during transition.

In my system of control as illustrated, a pair of motors with divided field windings are reversely connected in series with each other and with a starting resistance; by the term "reversely connected in series", I mean that the motors are connected in series, with the fields of the two motors connected between the two armatures as illustrated in the drawings. After starting the motors, the resistance is gradually cut out and a bridge connection established between intermediate taps in the field windings of the two motors until the motors are connected in parallel. This connection weakens the field strength of the two motors giving a higher running speed.

The portions of the field windings shunted by the bridge connection are then utilized to establish a full field parallel relation of the two motors with part of the resistance in series with each motor. The bridge connection is then broken and the motors are left in full field parallel relation with resistance in each circuit. This resistance is then gradually cut out and finally the field of each motor is tapped at an intermediate point to produce weakened fields for higher speed parallel operation.

In passing from series to parallel it will be seen that the full field is introduced without an intervening time interval and the possibility of a sag in torque is therefore eliminated.

A better understanding of my invention will be had by referring to the accompanying drawing in which Figure 1 illustrates diagrammatically a pair of motors and a controller by means of which the various steps in my control system are accomplished; Figs. 2 to 7 show the successive series connections; Fig. 8 shows the connection established preparatory to shifting the motors from series to parallel and Figs. 9 to 12 show the successive parallel connections.

Referring to the drawing, A and A' represent respectively the armatures of two series wound motors each having its field divided into two parts as at F, F' and $F^2$, $F^3$ respectively. Sections of starting resistance $r$, $r^1$ $r^2$ and $r^3$ are provided for varying the speed of the motors. C is a controller, which as shown is of the ordinary drum type provided with contact fingers $a$ to $k$ and coöperating contact segments arranged to provide the desired motor connections. The various running positions are indicated by dotted lines of which 1 to 6 are the series positions; $6^a$ indicates the transition step and 7 to 10 are the parallel positions.

The first controller finger $a$ is connected through the lead T to the source of current. When the controller C is moved to the first running position indicated by the dotted line 1 the motors are connected to the source of current in series with each other and with the resistances $r$, $r^1$, $r^2$ and $r^3$ as shown in Fig. 2.

As the controller is moved from position 1 to position 2 the section of resistance $r^1$ is short-circuited and as the controller is progressively moved through positions 3, 4 and 5 the other sections of resistance are short-circuited as shown in Figs. 3 to 6 inclusive and finally as the controller is moved forward to position 6 a bridge connection is established between the intermediate points in the field windings of the two motors and the connection between resistances $r^1$ and $r^2$ is broken. This arrangement, illustrated in Fig. 7, gives a weakened field condition. The dotted line $6^a$ indicates the transition step where the disconnected portions of the motor fields are utilized to establish a full field parallel arrangement of the motors as shown in Fig. 8 without breaking the bridge connection of the last series position and without opening the motor circuit.

As the controller is advanced to position 7, the tapped field bridging connection is broken and the motors are then in full field parallel arrangement with resistance in series with each motor as in Fig. 9.

The resistances in the two motor circuits are then gradually cut out as the controller is moved through positions 8 and 9, as illustrated in Figs. 10 and 11; and finally in position 10 of the controller a portion of each motor field is tapped out as illustrated in Fig. 12.

It will be seen that by my invention the transition of a plurality of tapped field motors from series to parallel relation is successfully accomplished without breaking the motor circuits and without unbalancing of the load on the motors.

I have set forth above, the principle of operation of my invention and have described and illustrated it as embodied in a specific manner, but it will be obvious to those skilled in the art that various changes and modifications may be made without departing from the spirit of my invention, the scope of which is set forth in the appended claims.

What I claim as new and desire to secure by Letters Patent of the United States, is:—

1. The series-parallel method of control for a plurality of series motors which consists in connecting the motors in series bridging across intermediate points in the fields, and then making the parallel connection with the bridge connection maintained.

2. The series-parallel method of control for a plurality of series motors which consists in connecting the motors in series to a source of supply, shunting a portion of the field of each motor, and then connecting the motors in parallel with full field with the connection of the motors to the source of supply maintained during the transition from the series to the parallel connection.

3. The series-parallel method of control for a plurality of series motors which consists in connecting the motors in series to a source of supply, disconnecting a portion of the field of each motor while maintaining the connection of the motors to the source of supply, and then connecting the motors in parallel with full field without having opened the connection of the motors to the source of supply.

4. The series-parallel method of control for a plurality of series motors which consists in connecting the motors in series with full field, weakening the motor fields until making the parallel connection and then connecting the motors in parallel with full field.

5. The series-parallel method of control for a plurality of series motors which consists in connecting the motors in series with full field, establishing a bridge connection between the motors at intermediate points in the fields, connecting the motors in parallel with the bridge connection maintained, and finally breaking the bridge connection.

6. The series-parallel method of control for a plurality of series motors which consists in connecting the motors in series with full field, weakening the motor fields until making the parallel connection, and then connecting the motors in parallel with full field without having opened the motor circuit.

7. The series-parallel method of control for a plurality of series motors which consists in connecting the motors in series with full field, weakening the fields by bridging across intermediate points in the fields before connecting the motors in parallel and finally breaking the bridge connection after the full field parallel connection of the motors is made.

8. The series-parallel method of control for a plurality of series motors which consists in connecting the motors reversely in series with full field, weakening the fields by bridging across intermediate points in the fields before connecting the motors in parallel, and finally breaking the bridge connection after the full field parallel connection of the motors is made.

9. The series-parallel method of control for a plurality of series motors which consists in connecting the motors in series with full field, weakening the fields by bridging across intermediate points in the fields until making the parallel connection and finally connecting the motors in full field parallel without opening the motor circuit.

10. The series-parallel method of control for a plurality of series motors which consists in connecting the motors in series with full field, weakening the fields by shunting a portion of each field until the full field parallel connection is made, connecting the motors in full field parallel with a resistance in each motor circuit, and finally breaking the shunt connection.

11. The series-parallel method of control for a plurality of series motors which consists in connecting the motors in series with a starting resistance, short circuiting the resistance, bridging across intermediate points in the fields and open-circuiting the resistance, connecting the motors in parallel with a portion of the resistance in each motor circuit without having opened the motor circuit, and finally breaking the bridge connection.

12. The series-parallel method of control for a plurality of series motors which consists in connecting the motors in series with full field, weakening the fields by shunting portions of the fields and open circuiting the shunted portions, connecting the motors in parallel with the shunted portions of the fields reconnected in circuit, and finally opening the shunt circuit.

13. The series-parallel method of control for a plurality of series motors which consists in connecting the motors in series with full field, weakening the fields until making the parallel connection, connecting the motors in parallel with full field, and finally weakening the fields.

14. The method of control for a plurality of series motors which consists in connecting the motors in series with full field, disconnecting a portion of the field of each motor until making the parallel connection, connecting the motors in parallel with the portions of the fields reconnected in circuit, and finally disconnecting a portion of the field of each motor.

15. The combination with a plurality of series motors of a series-parallel controller therefor having means whereby the motors are first connected in series with full field, then the field of each motor weakened until the parallel connection is made and finally the motors are connected in parallel with full field.

16. The combination with a plurality of series motors of a series-parallel controller therefor having means whereby the motors are first connected in series with full field, then a bridge connection established between the motors at intermediate points in their fields, next a full field parallel connection of the motors is made with the bridge connection maintained and finally the bridge connection is broken.

In witness whereof, I have hereunto set my hand this 23rd day of March, 1915.

FRANK E. CASE.

Witnesses:
BENJAMIN B. HULL,
HELEN ORFORD.